May 18, 1937. J. C. RAH 2,080,743
SPLIT INSULATING JOINT FOR ELECTRICAL CABLES
Filed Jan. 23, 1932
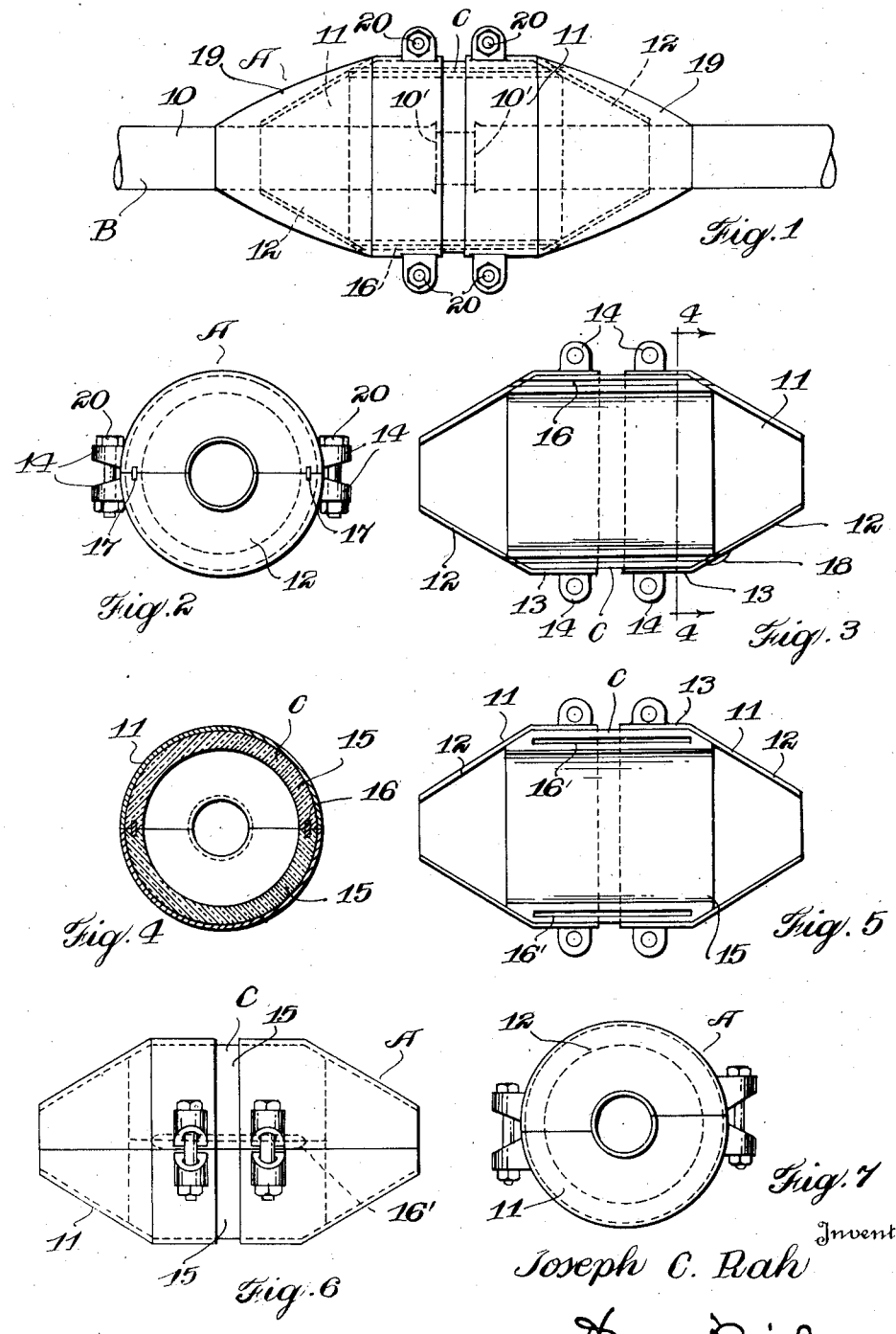
Joseph C. Rah, Inventor Patented May 18, 1937

2,080,743

UNITED STATES PATENT OFFICE 2,080,743

SPLIT INSULATING JOINT FOR ELECTRICAL CABLES

Joseph C. Rah, Chicago, Ill., assignor to Delta-Star Electric Company, Chicago, Ill., a corporation of Illinois Application January 23, 1932, Serial No. 588,287

7 Claims. (Cl. 173—268)

In electrical cables it is often found advisable to cut away a portion of the lead sheath of the cable and secure a sleeve of insulating material between the cut ends to reduce the sheath currents in the cable. This is often done at points where the power losses are found to be excessive. The cost of splitting and insulating the cable has been high, however, because of the method followed. Even where power losses were great, it has sometimes been inadvisable to split the cable, as it has been necessary to cut the entire cable for the purpose of securing an insulating sleeve in position.

I have provided a split insulator which may be applied to installed cables after the magnitude of the losses is determined from actual use without removing the cable from service, for my insulator may be put into place while current is passing through the cable. The split formation of the insulator permits the same to be installed without the necessity of severing the cable. Thus the cumbersome high tension joint which is costly to install is obviated by my construction. My insulator may be installed at a great saving, and forms an oil proof joint between the cut ends of the sheath by merely clamping the split halves of the insulator together.

It is a feature to provide a casing which may be secured over the electrical cable and clamped rigidly in place, with the ends of the casing wipe-jointed with the cable sheathing while an insulating portion is sealed and clamped between the end portions to provide the central portion of the joint and to form an oil-tight connector around the split cable sheathing, so that the insulating oil or material may fill the split insulating joint and pass along in the cable sheathing to protect the electrical cable in the regular manner.

A further feature resides in a portion which may be made of any suitable material, like bakelite, or other insulating material and which is made in sections with a groove or slotted joint between the sections. This joint receives a suitable packing which is held in the grooves to form a sealing joint between the members to make them tight when clamped by the end members of the split insulating joint. This structure where the insulating material is formed of sections and the end members are formed split or in sections, makes a sectional or jointed insulating casing which can be clamped around the sheathing of the electrical cable. The ends of the joint are of metal so that they can be adhered or sealed by a wipe-joint to the electric cable sheathing, while the center or intermediate portion of the joint is of insulating material so that the ends are spaced apart from each other by the insulating central portion, which is also made in sections as hereinbefore stated, thereby providing an insulating joint which will break up or insulate one portion of the cable sheathing from another portion so as to overcome any electrical conductivity along the cable sheathing. This is an important feature of my split insulating joint.

All of the other details and features will be more fully described.

In the drawing forming part of this specification:

Figure 1 is a view illustrating the use of my split insulating joint for electrical cables, as it would appear in use.

Figure 2 is an end view of the same.

Figure 3 is a plan view showing the upper sections removed of my split insulating joint.

Figure 4 is a section through the assembled joint, taken at a point designated by the line 4—4 of Figure 3.

Figure 5 is a similar view to Figure 3, showing different type packing grooves in the insulating central portion of the split insulating joint.

Figure 6 is a side outer view of the structure of the split insulating joint, illustrated in Figure 5, where the packing grooves in the insulating central portions are of a different character than those illustrated in Figures 1 and 4, inclusive.

Figure 7 illustrates one of the alternative forms of the end sections of my split insulating joint.

The split insulating joint A is constructed to clamp around and cover the sheathing 10 of the electrical cable B so as to cover the separated and flared ends 10'. When a portion of the sheathing is removed it forms the separated ends 10'. This permits a tight joint to be made about the cable and permits the insulating fluid or oil to fill the split insulating joint A when the same is clamped about and firmly secured to the cable sheathing 10. The split insulating joint A is formed of sectional end members 11 which have tapered ends 12 which are adapted to taper toward the sheathing 10 and are formed with an inner cylindrical portion 13 having bolt ears 14 on either side through which the bolts 20 are adapted to extend.

The sectional end members 11 which provide the split end portions for the joint A are adapted to clamp around the cylindrical insulating member C which is made in sectional portions 15 which may be of two or more portions, and a suitable packing groove 16 is formed extending longitudinally in the abutting faces of the sections 15 in which a packing may be inserted so that when the sections 15 are clamped together by the end portions 11 a tight joint is provided.

The insulating member C is formed in a manner to space the metal end clamping members 11 apart, as illustrated in Figure 1, and suitable notches 17 are formed in the tapered ends 12 of the members 11. These notches 17 are in line with the grooves 16, so that when the end members 11 clamp the insulating sections 15 together, the packing may extend out these openings 17 and a suitable tack or metal plug, like a thumb tack, such as 18, may be inserted into the packing material in the groove 16 and the head of the same form a metal covering over the packing material. This facilitates the making of a wipe-joint such as 19, to be made extending from the sheathing 10 over the tapered ends 12 of the members 11 to form a tight and virtually integral joint between the sheathing and the end members 11. The central insulating portion C separates the metal ends and forms an electrical insulator between the same and is clamped rigidly in place to form a tight joint between the sections of the same by means of the packing in the grooves 16. Thus when the bolts 20 are drawn tight, the ends 11 clamp the insulating housing or casing portion C around the separated ends 10' of the sheathing of the cable B.

This permits a split to be made in the sheathing 10 at any place in the cable and also permits the insulating fluid inside the sheathing to pass freely into my split insulating joint, filling the same and to pass from one portion of the sheathing 10 to the other. This split insulating joint provides a means of breaking up any electric conductivity following along the cable sheathing 10 of the cable B. When my split insulating joint A is secured in place around the cable B it provides virtually an integral connection with the sheathing 10 and has the advantage of the insulating sleeve-like portion C which overcomes any electric conductivity along the cable sheathing.

Figure 7 illustrates the form of end clamp sections from an end view of the same, where the shape is slightly different in that one side of the member is shorter than the other side. The function and operation of this form of the end sections are the same only that on one side the member is longer or extends over the center line, while on the other side it is shorter and extends below the center line, the other complemental half or section of the clamp A being of the same formation so that they would fit together. This permits the laying of one of the sections of the insulating sleeve C in the ends, like illustrated in Figure 7, with one side of the insulating sleeve projecting beyond the edge of the end clamps, while the other side of the insulating sleeve is receded below the edge of the end clamp.

The packing groove 16 may be made in the form illustrated in Figure 5, such as 16', where the ends of the groove are positioned short of the ends of the insulating sheathing sections 15. This permits a tight joint to be made by inserting a packing of any suitable nature in the groove 16' when the sections 15 are connected together, and then by putting the end clamping portions 11 over the same, the insulating sleeve C is drawn tightly together as illustrated in Figure 6 with the packing in the grooves 16. This forms a tight insulating joint about the cable B in the same manner as hereinbefore set forth.

My split insulating joint has advantages of permitting the cable sheathing 10 to be split at any place throughout the length of a cable and the joint A is secured thereabout to protect the electric cable B. The insulating sleeve C may be made of bakelite or any suitable insulating material, while the end clamping members 11 may be made of bronze or any suitable metal. These end portions are secured to the cable sheathing by a wipe-joint and the seams between the same soldered so that the end clamping members 11 are firmly secured, the bolts 20 holding them rigidly in place around the insulating sleeve C. The split insulating joint A can be used on cables where the loss due to induced current is appreciable. This joint may be put on the cables any place. In the old type where the joint was not split the cable head would be cut, therefore my split or sectional insulating joint for electric cables is of a very desirable nature.

In accordance with the patent statutes I have set forth the best embodiments of my split insulating sleeve which is formed in the sections specified, and while I have designated its purpose and use for a particular adaptation and have shown certain structural formation, I desire to have it understood that the same may be used and considered within the scope of the following claims as being a part of this invention.

I claim:

1. A split insulation joint for cable sheathing including, a split insulating sleeve, packing interposed between the parts of said sleeve, split clamping means for clamping said sleeve to the separated ends of the cable sheathing, said packing terminating at each end outside said clamping means, and a wiped covering over the complemental edges on said split clamping means and the ends of said packing.

2. A split insulating joint for cable sheathings including, a split insulating sleeve, packing interposed between the parts of said sleeve and terminating outside of said sleeve, and spaced metallic means wipe connected to the cable sheathings for connecting said split sleeve to the separated ends of a cable sheathing, said wipe connection covering said packing terminations.

3. A split insulating joint for cable sheathings including, a split insulating sleeve, means for clamping the ends of said sleeve to form a tight joint between the parts of said sleeve and between the sleeve and said clamping means, complemental grooves in the meeting edges of said insulation and said clamping means, packing in said grooves terminating outside said clamping means, and a wiped joint between said clamping means and the separated ends of a cable sheathing and over the ends of said packing to provide a tight joint between said clamping means and said cable sheathing.

4. A split insulation joint for cable sheathings including an insulating sleeve split longitudinally to provide separate portions, a pair of end members each longitudinally split to provide separate parts enclosing the ends of said sleeve, said members being positioned in spaced relation, means for connecting said end members to said cable sheathings, and means for clamping said parts of said end members together to clamp said sleeve tightly within said end members to provide waterproof joints between said sleeve and said end members and to clamp the sleeve portions tightly together to provide a waterproof joint between said sleeve portions.

5. A split insulation joint for cable sheathings including a split insulating sleeve, a pair of split end members for connecting said sleeve to said cable sheathings, packing between the split portions of said sleeve, the ends of said packing extending between the split portions of said end members and terminating externally of the same, and a wipe joint over the connection between said end members and said cable sheathings, said wipe joint extending over the terminations of said packings.

6. A split insulation joint for cable sheathings including a sleeve longitudinally split to provide separate portions, tapered ends thereupon, a pair of end members of tapered formation to fit over said ends, each end member being formed of two parts, means for clamping said two parts together to form a waterproof joint between said end members and the tapered ends of said sleeve, and additionally to clamp said end members and sleeve together to provide a waterproof joint between the portions of said sleeve.

7. A split insulation joint for cable sheathings including a sleeve longitudinally split to provide separate portions, end members for said sleeve each longitudinally split to provide separate parts, means for clamping said parts of each end member together to provide a waterproof joint between said end members and said sleeve, said clamping means also drawing the parts of said end members and the portions of said sleeve together to provide a waterproof joint between the said parts of each end member and between the said portions of said sleeve.

JOSEPH C. RAH.